Figure 1:
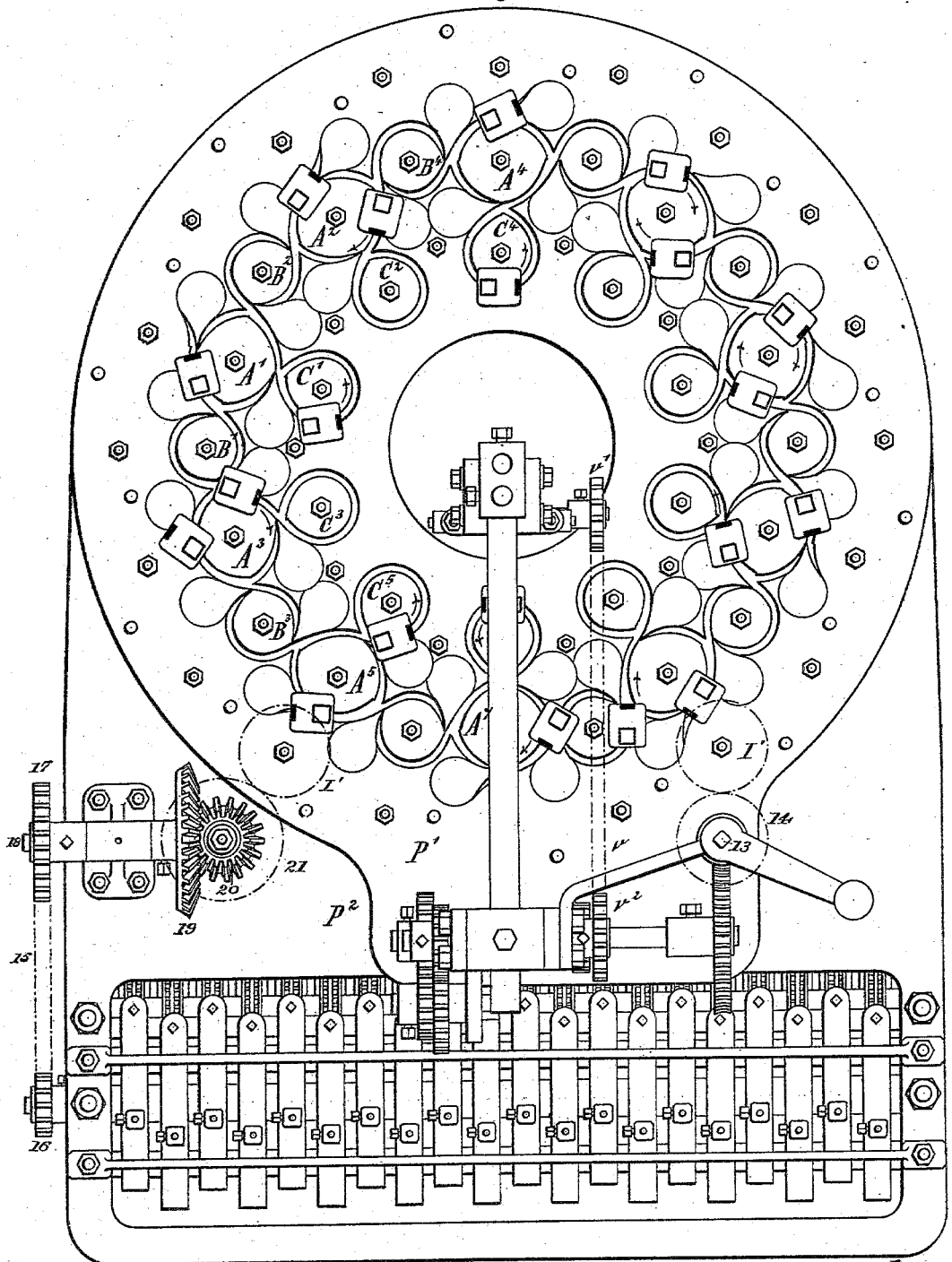

(No Model.) 11 Sheets—Sheet 1.
W. HEDTMANN.
BRAIDING MACHINE.

No. 288,236. Patented Nov. 13, 1883.

Attest:
Geo. H. Graham
T. H. Palmer

Inventor,
W. Hedtmann
by Munson & Philipp
Attys.

(No Model.)  11 Sheets—Sheet 3.

W. HEDTMANN.
BRAIDING MACHINE.

No. 288,236.  Patented Nov. 13, 1883.

Attest:
Geo. H. Graham
J. H. Palmer

Inventor,
W. Hedtmann
by Munson & Philipp
Attys (No Model.)  
11 Sheets—Sheet 4.

W. HEDTMANN.
BRAIDING MACHINE.

No. 288,236. Patented Nov. 13, 1883.

Attest:  
Geo. H. Graham  
T. H. Palmer

Inventor,  
W. Hedtmann  
by Munson & Philipp  
Attys.

(No Model.)   
W. HEDTMANN.  
BRAIDING MACHINE.  
No. 288,236.  Patented Nov. 13, 1883.

11 Sheets—Sheet 5.

(No Model.) W. HEDTMANN. 11 Sheets—Sheet 6.
BRAIDING MACHINE.

No. 288,236. Patented Nov. 13, 1883.

Attest:
Geo. H. Graham
J. H. Palmer

Inventor
W. Hedtmann
by Munson & Philipp
Attys.

(No Model.) 11 Sheets—Sheet 7.
W. HEDTMANN.
BRAIDING MACHINE.

No. 288,236. Patented Nov. 13, 1883.

Attest:
Geo. H. Graham
T. H. Palmer

Inventor
W. Hedtmann
by Munson & Philipp
Attys (No Model.)  
11 Sheets—Sheet 8.

W. HEDTMANN.
BRAIDING MACHINE.

No. 288,236. Patented Nov. 13, 1883.

Attest:  
Geo. H. Graham  
T. H. Palmer

Inventor  
W. Hedtmann,  
by Munson & Philipp  
Attys (No Model.) 11 Sheets—Sheet 9.

W. HEDTMANN.
BRAIDING MACHINE.

No. 288,236. Patented Nov. 13, 1883.

Attest:
Geo. H. Graham
T. H. Palmer

Inventor
W. Hedtmann
by Munson & Philipp
Attys (No Model.)  11 Sheets—Sheet 10.
W. HEDTMANN.
BRAIDING MACHINE.
No. 288,236.  Patented Nov. 13, 1883.
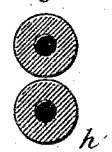
Fig. 17.
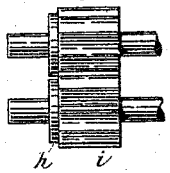
Fig. 18.
Fig. 19.
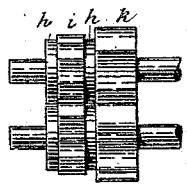
Fig. 20.
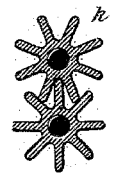
Fig. 21.
Fig. 22.
Fig. 23.
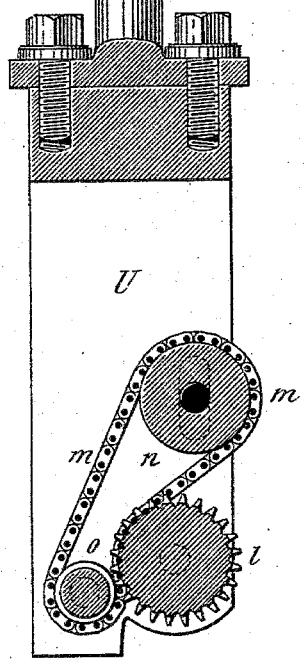
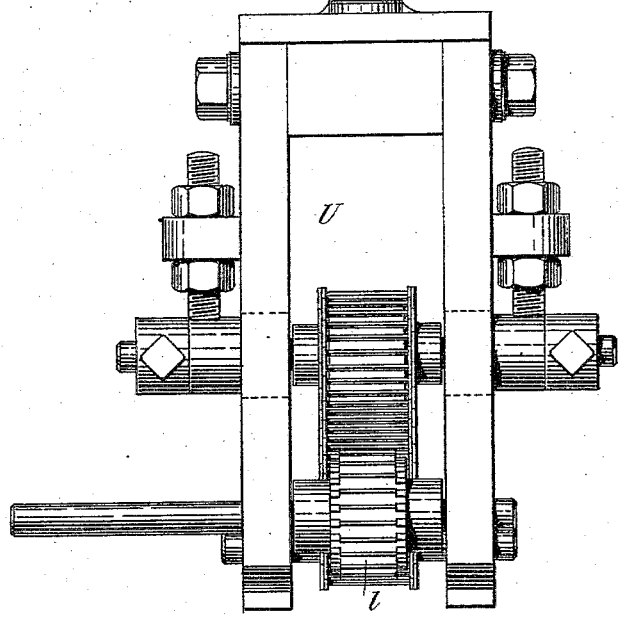
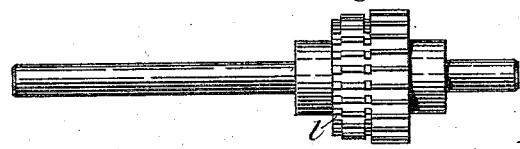
Fig. 24.  Fig. 25.
Attest:
Geo. H. Graham
T. H. Palmer
Inventor,
W. Hedtmann
by Munson & Philipp
Attys.

(No Model.) 11 Sheets—Sheet 11.

W. HEDTMANN.
BRAIDING MACHINE.

No. 288,236. Patented Nov. 13, 1883.

Attest:
Geo. W. Graham
A. N. Jasberg

Inventor,
Wilhelm Hedtmann
by Munson & Philipp
Attys

UNITED STATES PATENT OFFICE.

WILHELM HEDTMANN, OF LANGERFELD, HAGEN, GERMANY, ASSIGNOR TO ALBERT HENKELS, OF SAME PLACE.

BRAIDING-MACHINE.

SPECIFICATION forming part of Letters Patent No. 288,236, dated November 13, 1883.

Application filed January 12, 1881. (No model.) Patented in England March 23, 1880, No. 1,236; in Germany March 28, 1880, No. 15,241, and in Belgium July 15, 1880, No. 52,041.

*To all whom it may concern:*

Be it known that I, WILHELM HEDTMANN, of Langerfeld, district of Hagen, Germany, have invented certain new and useful Improvements in Braiding-Machines, (for which Letters Patent have been granted in Great Britain and Ireland on the 23d of March, 1880, No. 1,236; in Belgium on the 15th of July 1880, No. 52,041, and in Germany on the 28th of March, 1880, No. 15,241,) of which the following is a specification.

My invention constitutes an improvement upon former braiding and plaiting machines, in which a number of spools are caused to run in curved guide-tracks in such a manner that the threads on the said spools will be plaited together, so as to form a braid or plaiting of the required pattern; and the improvements consist in certain construction and combination of parts whereby every single thread is controlled in any desired manner, and by means of which the threads may be made to work together in groups containing any desired number of them, while they may be separated again from each other at will, the purpose of such arrangements being to produce on the said machine laces of any complexity and variety of design, such as have hitherto only been made by hand, as well as braids of ornamental character.

The invention is represented in the annexed eleven sheets of drawings.

Figure 2:
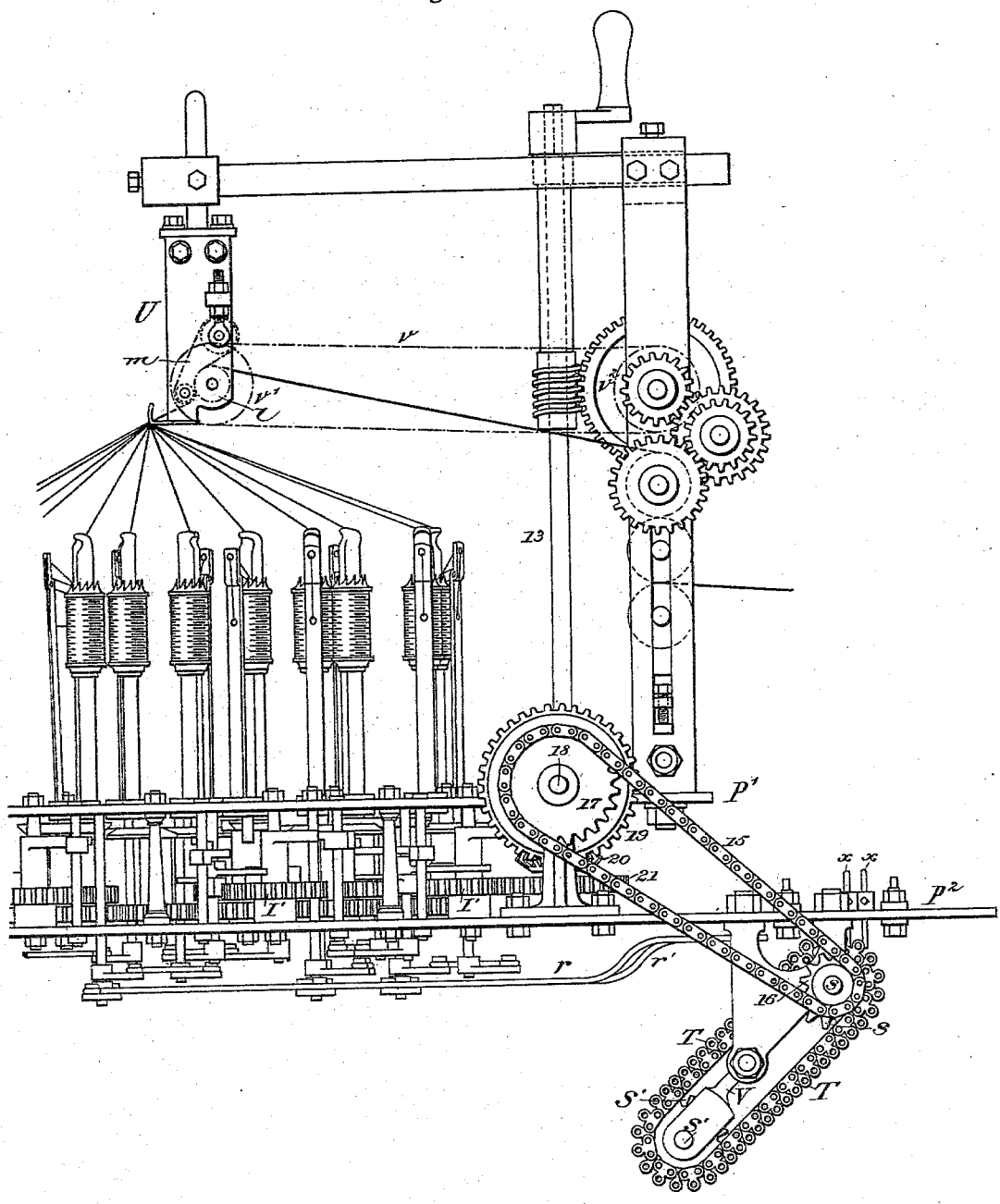
Figure 3:
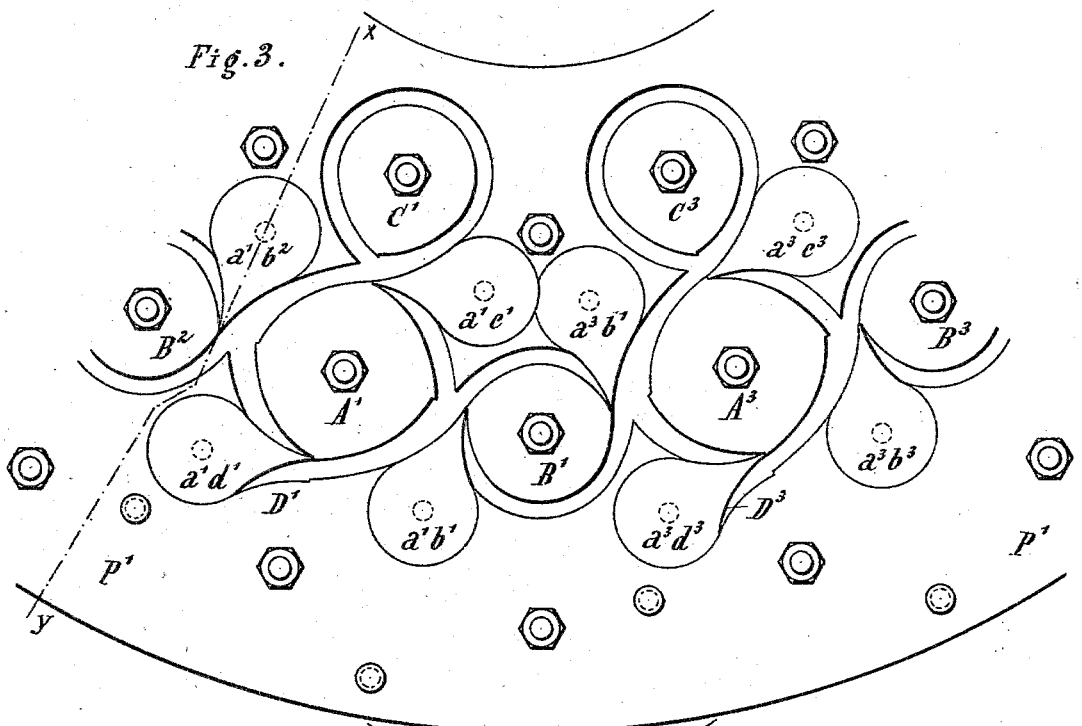
Figure 4:
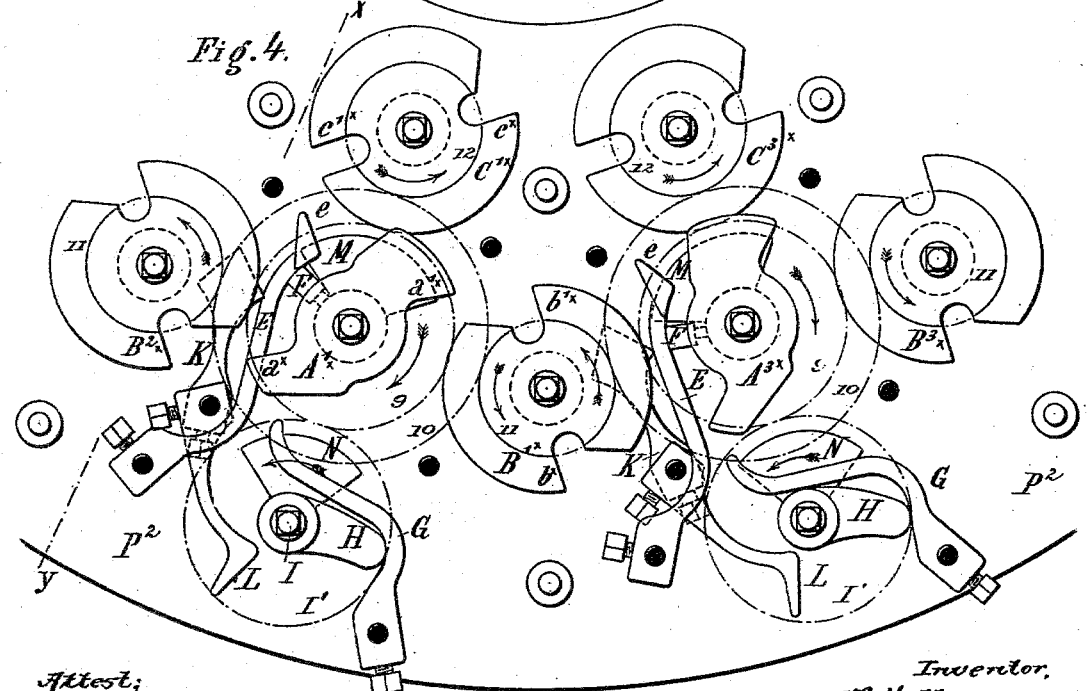
Figure 5:
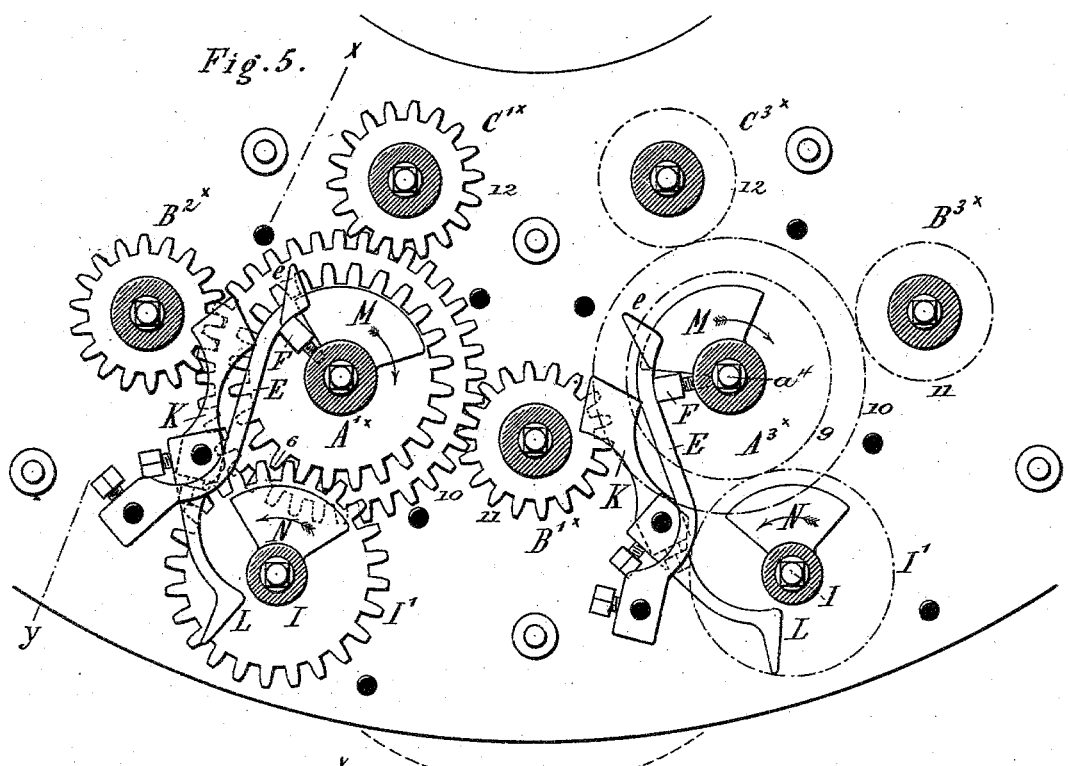
Figure 6:
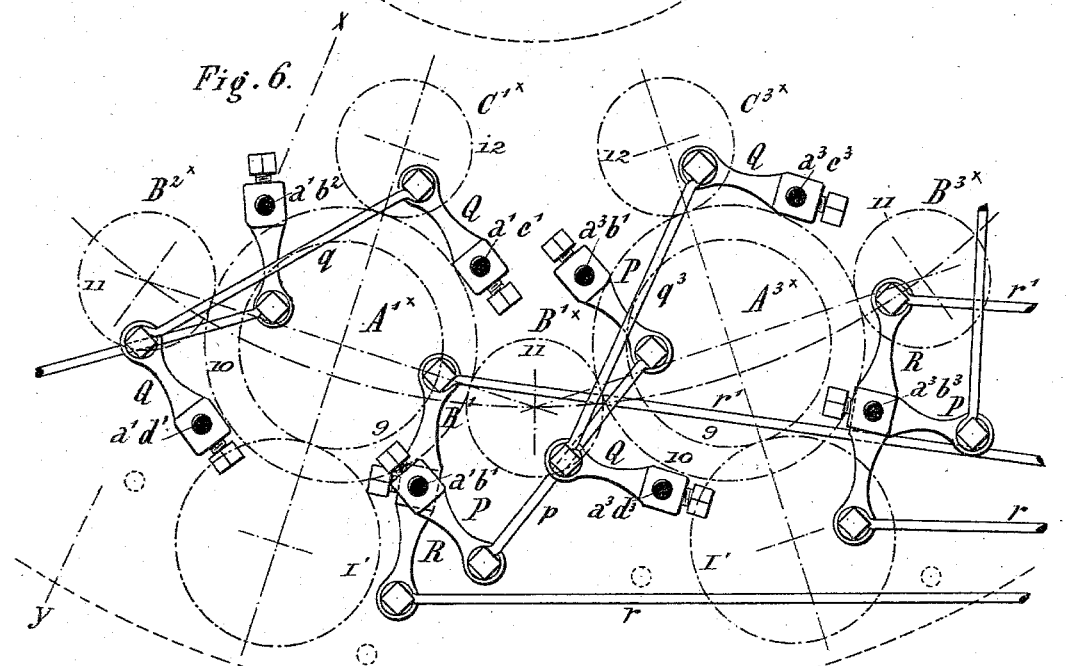
Figure 7:
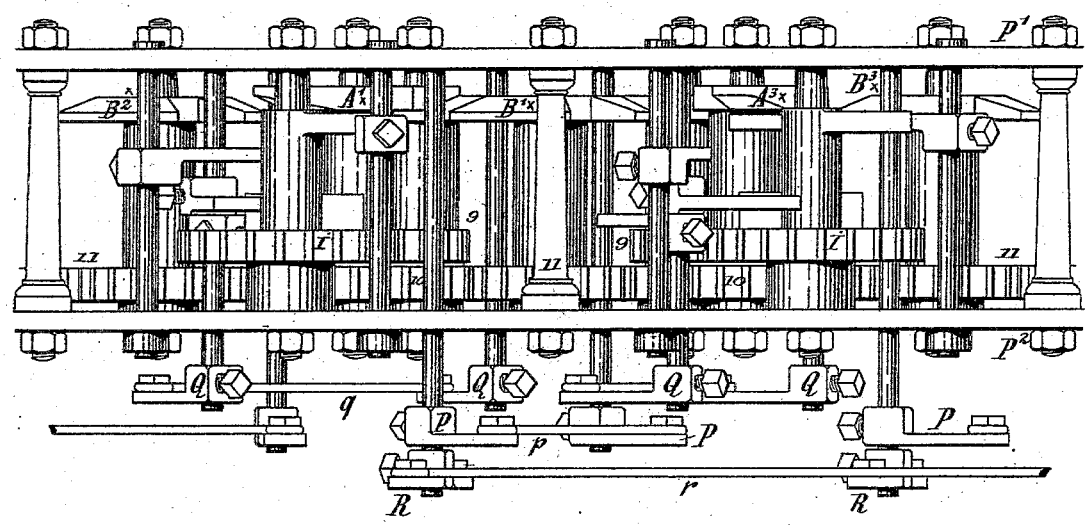
Figure 8:
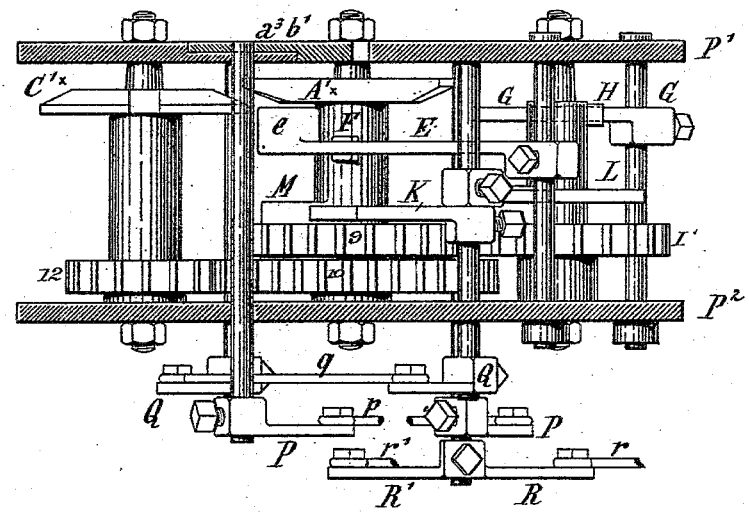
Figure 13:
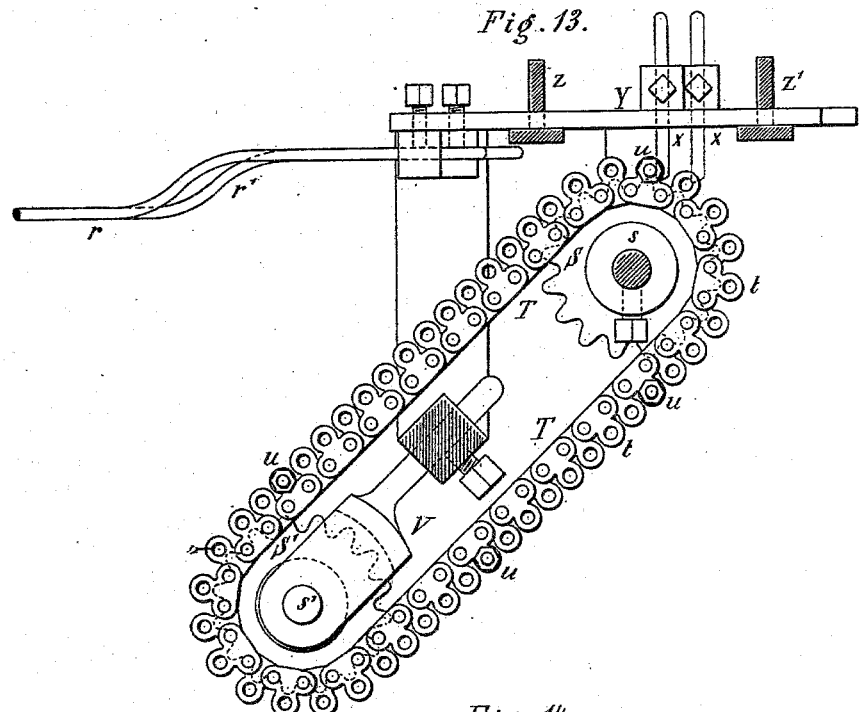
Figure 14:
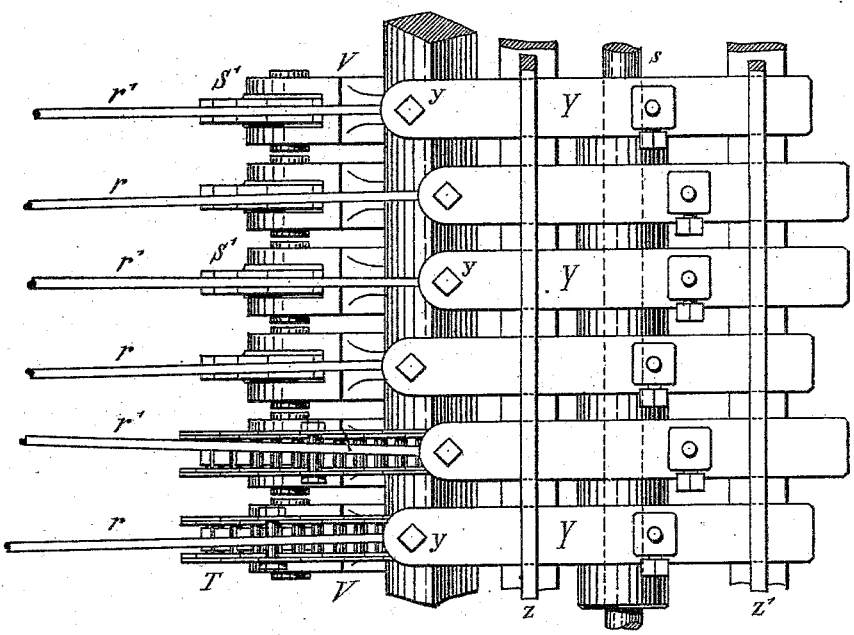
Figure 15:
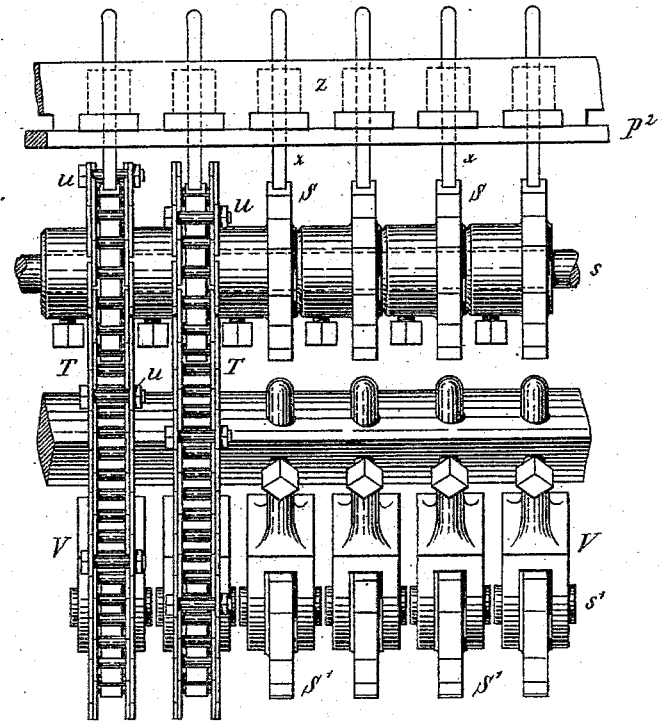
Figure 16:
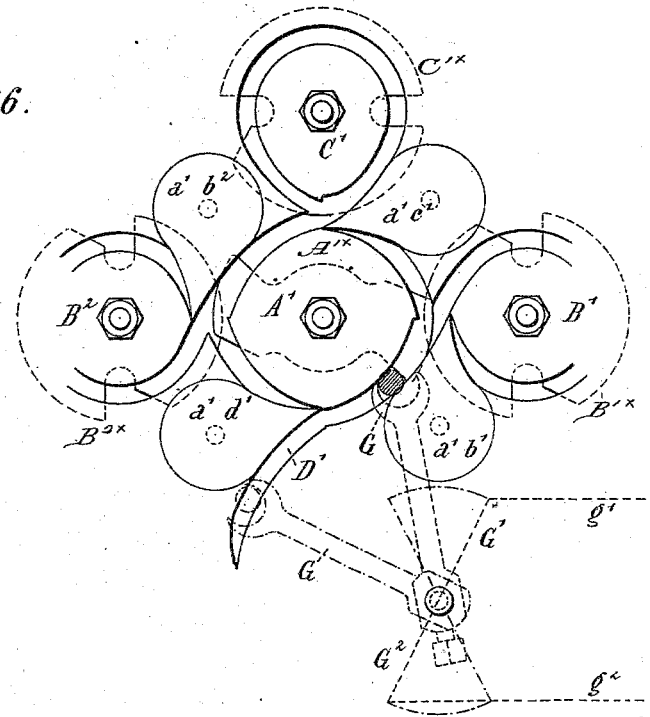
Figure 26:
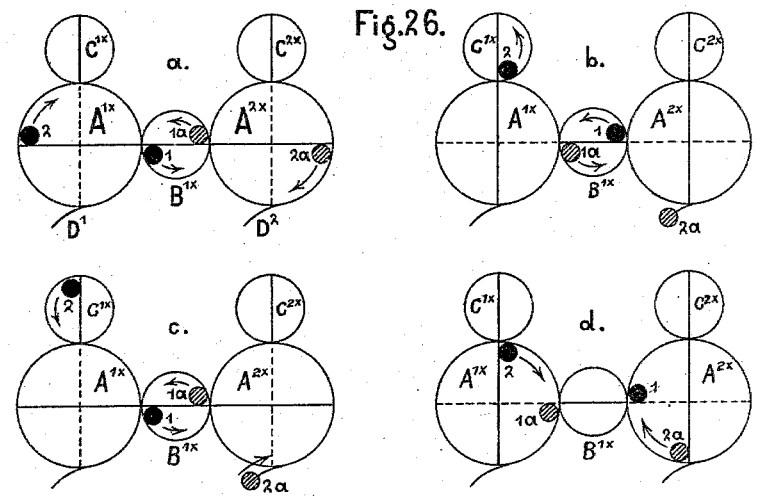
Figure 27:
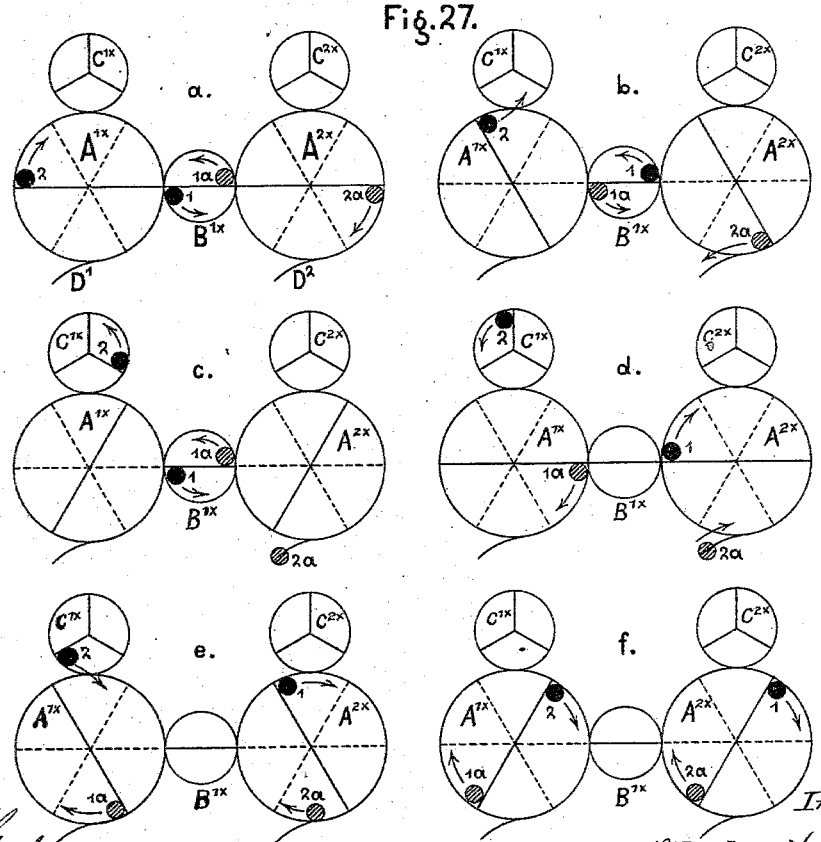

Figure 1 is a plan of the machine, and Fig. 2 a side elevation of the same. Fig. 3 is a part of the top plate, P', drawn to a larger scale, and showing the guide-track and the switches which direct the spools into one part or another of the track. Fig. 4 is a top view of a number of the driving-heads and accessory parts arranged below plate P'. Fig. 5 shows the spur-wheels corresponding to and placed below the driving-heads shown in Fig. 4, as also some of the devices for controlling the spools. Fig. 6 represents the various levers fitted beneath the bottom plate, P², to the axles of the switches shown in Fig. 3. Fig. 7 is an elevation of the part of the machine shown in detached plan views in Figs. 3 to 6, while Fig. 8 is a section on the line $x\ y$ of the same figures. Figs. 9, 10, 11, and 12 represent part of the course of two spools and the different positions of the driving-heads, switches, levers, &c., required to direct the spools in a certain manner. Figs. 13, 14, and 15 represent in side view plan and front elevation, respectively, a controlling or pattern apparatus by which switches are operated so as to produce a pattern, this pattern allowing of its being varied by certain changes effected in the apparatus. Fig. 16 shows a modification of a certain part of the machine. Figs. 17 to 21 represent in elevation and in section an apparatus serving to take up from the machine the finished braid or lace. Figs. 22 to 25 are views of a modification of this apparatus. Figs. 26 ($a\ b\ c\ d$) and 27 ($a\ b\ c\ d\ e\ f$) are diagrams, serving to explain certain arrangements with regard to the driving-heads and the course of the spools.

The machine consists, in the first place, of a number of driving-heads mounted on hollow vertical axles which rotate on pillars fixed with their lower ends to the bottom plate, P², and these pillars carry at their upper end disks $A'\ A^2\ A^3$, &c., $B'\ B^2\ B^3$, &c., $C'\ C^2\ C^3$, &c., which form, together with the curved inside edges of the plate P', (see Fig. 1,) the guide-track for the spools to work in. Of the said driving-heads there are three classes—the main heads $A'^\times\ A^{3\times}$, &c., the intermediate heads, $B'^\times\ B^{2\times}\ B^{3\times}$, &c., and the auxiliary heads $C'^\times\ C^{3\times}$, &c.—a number of which have been shown in Figs. 4, 7, and 8. These heads are herein shown in a circular series, but might be arranged in a straight series, if desired.

Each main head is provided with a toothed wheel, 9, and with a toothed wheel, 10. This latter wheel gears with a toothed wheel, 11, with which each intermediate head is provided, and with a toothed wheel, 12, with which each auxiliary head is provided. The wheels 9 gear with toothed wheels I', which operate tappets and switches, as hereinafter explained. By this arrangement the spool-controlling devices are operated in appropriate relative time, the wheel 11 not only driving an intermediate head, but transmitting motion from one main head to another. (See Fig. 5.)

The motion of the main shaft 13 is communicated through a gear-wheel, 14, to one of the wheels I', (see Fig. 1,) and thus drives the train.

The heads propel the spools forward by means of their driving-edges—such as $a^*$ $a'^*$ of head, as $A'^*$ $b^\times$ $b'^\times$ of the head $B'^\times$ in Fig. 4, $c^\times$ $c'^\times$ of the head $C'^\times$, &c. The parts of the heads between any pair of driving-edges (or between the corresponding notches) have herein been called "wings," while the peripheral distance from one driving-edge to another—i. e., the unit of pitch—is termed "the length of a wing."

The heads $B'^\times$ $B^{2\times}$, &c., and $C'^\times$ $C^{3\times}$, &c., as shown in the drawings, are two-winged, and either of their driving-edges runs at every revolution over a distance equal to the length of two wings. The heads $A'^\times$ $A^{3\times}$, &c., although they have in fact only two driving-edges, are to be considered as four-winged heads—i. e., as heads having virtually the number of four wings, two of which are cut away. The distance from one driving-edge to the other is therefore equal to two units of pitch, or to two wings' length, and at every rotation of the head each driving-edge passes over a distance equal to the length of four wings.

The pinions with which the axles of the heads are provided gear together, as shown by Fig. 5, in such a manner that during one rotation of any one of the main heads each of the auxiliary and of the intermediate heads rotates twice. The reference characters belonging to the heads are placed on or near the pinions in this figure, to indicate to which of the heads each pinion belongs.

The proper direction is imparted to the spools by switches shown in Fig. 3. These consist of pointed disks let into the top plate, P', so as to be flush with its upper surface. $a'$ $b'$ is the switch between the disks A' and B', $a'$ $c'$ the switch between A' and C'. Besides these there are switches $a'$ $d'$ $a^3$ $d^3$, &c., by which short branch or side tracks, D' D³, &c., may be opened for spools to run into when they are to remain inactive for a certain period. The switches belonging to a main disk on one hand and to the corresponding auxiliary disk and the side track on the other hand—as, for instance, the switches $a'$ $c'$ and $a'$ $d'$ belonging to disks A' and C' and siding D'—are connected together by means of levers Q Q, fixed on their axles, and by the connecting-rod $q$, (see Figs. 6, 7, and 8,) and they are operated by means of the levers K and L, Fig. 4, the former being acted upon by the tappet M on the axle of the corresponding main head, the latter by a tappet, N, on the axle I, which is rotated by the pinion I', as shown in Fig. 5. The said switches consequently close and reopen the track of any main head once during every rotation of such head. The two switches between any intermediate disk and its adjacent main disk—as, for instance, the switches $a'$ $b'$ and $a^3$ $b'$ between the intermediate disk, B', and the main disk A' and A³, which always have to be shifted at the same time—are coupled together by the levers P and a rod, $p$, and they are worked by levers R and R', fixed to one of the switch-axles and connected by rods $r$ and $r'$ with the controlling apparatus, Figs. 13, 14, 15. The switches may, however, all be worked by the controlling apparatus either singly or in pairs, as may be desired.

E is a lever, the beak $e$ of which prevents a spool from passing while the tappet F presses the lever outward, and G is another lever or arm which, when actuated by the tappet H, serves to push out of the siding D' D³, &c., any spool which has been there detained.

By means of the different switches belonging to the main heads $A'^\times$ $A^{3\times}$, &c., and to the auxiliary heads $B'^\times$ $B^{2\times}$ $B^{3\times}$, &c., each of the said heads, (or the track corresponding thereto,) may be locked out from or put in communication with the adjacent head, (or its track.) According, therefore, as these switches are adjusted by the controlling mechanism, Figs. 13, 14, and 15, the spools are directed one way or the other, so that any spool may be caused to run around any single main head only, or to pass over by the intermediate head or heads to a second, a third main head, &c. In all cases the spool must be at a certain definite distance apart from each other to avoid collision; but when some of the spools pass along the track of an intermediate head, while others continue to move along the track of a main head, an alteration in the relative position of the spools takes place. In consequence thereof two spools would necessarily arrive at the same point of some one of the driving-heads if this were not prevented by suitable means. The arrangements for this purpose consist in the auxiliary heads $C'^\times$ $C^{3\times}$, &c., with their corresponding tracks, and in the branch tracks D' D³, &c., which constitute a sort of side line into which the spools, being in danger of collision, are guided, and where they are detained until they can be caused to resume their proper position in the train of spools.

For producing bobbin-lace it is further requisite that the number of rings on the main, intermediate, and auxiliary heads be in a certain definite relation to each other. The smallest number of wing-spaces on the main heads is four, (two of which are actual wings and two cut away, as before explained,) because at least two spools must work together at a time, and these spools must have an empty wing between them on either side, so that one spool or train of spools may cross another train while passing from one main head to another. The intermediate heads must have not less than two wings, as it is necessary that they be capable of taking up a spool from either of the adjacent main heads at once. These spools cause one full twist of the threads in case they return to the same main head, but only a crossing of the said threads if they pass over to the other main head.

The auxiliary heads, working together with main heads having the four-wing space and two-winged intermediate heads, may have one or two wings, as will be understood from the following consideration: As has already been stated, the spools must in their course always be maintained at a fixed distance from each other. Supposing, now, any spools to pass from one main head to another. They run over a distance of one wing's length when passing the intermediate head; but if the spools return from the intermediate head to the same main head they travel over a length of two wings. They are therefore too late, as it were, by, respectively, one or two wings' length when they again arrive on the main head. All spools which meanwhile continue rotating on main heads must consequently, in the first case, be detained in their course or put to the rear by the length of one wing, in the second case by the length of two wings, so that the spools passing over the intermediate heads may not come into collision with them on the same wings. This putting to the rear of the said spools may be effected by means of a one-winged auxiliary head, which is allowed to carry around the spools once or twice, according as they are to be detained by one or by two wings' length; but it has been found preferable to use two-winged auxiliary heads, and to let all spools not passing over an intermediate head travel over such auxiliary head, while the spools which run for a distance of only one wing's length on an intermediate head are caused to stop on the main head for a period equal to the traveling over a wing's length, so that they are detained upon the whole by two wings' length, and thereby put again into the right place in the train. For the purpose of causing the said stoppage the alternate ones of the four wings of the main heads are omitted, so that only two driving edges remain, and the heads are so arranged with respect to each other that a spool passing over an intermediate head will always arrive on the main head at a point in the middle between two driving-edges, in consequence whereof the head has still to rotate by a wing's length before it acts on the spool.

When the spools are required to rotate by more than one full turn on the intermediate heads, the relation between the number of wings on the different heads will be different from the foregoing. If, for instance, the spools are to make a turn and a half on the intermediate heads, the main heads must be at least six-winged—$i.\ e.$, their periphery must be equal to the length of six wings—of which, however, two on either side are omitted. With four-winged main heads it would not be possible to let the spools rotate in the aforesaid manner, as I shall now explain by referring to the diagrams shown by Figs. $26^a$, $26^b$, $26^c$, and $26^d$, which represent two four-winged main heads, $A'^*$ and $A^{2*}$, one intermediate two-winged head, $B'^*$, two auxiliary two-winged heads, $C'^*$ and $C^{2*}$, and opposite to the latter side tracks, $D'$ and $D^2$, the main heads being constructed according to the principles hereinbefore set forth—$i.\ e.$, with two driving-edges only—the intermediate wings (whose driving-edges are shown by dotted lines) having been omitted. In Fig. $26^a$ there are two spools, 1 and $1^a$, on the intermediate head, and two others, 2 and $2^a$, on the main heads $A'^*$ and $A^{2*}$, respectively. The former are supposed to have just passed from $A'^*$ and $A^{2*}$ to $B'^*$. Figs. $26^b$, $26^c$, and $26^d$ show the heads in three succeeding positions, supposing them to have been rotated by a wing's length for each following position. From the position shown in Fig. $26^a$ to that shown in Fig. $26^d$ the spools have therefore traveled over a distance equal to three wings' lengths, or, in other terms, they have made with the head $B'^*$ the presupposed one turn and a half, and consequently now pass over to the main heads. The latter, however, have at the points then presented no driving-edges, as will be seen by the aforesaid dotted lines in Fig. $26^d$. The spools will therefore have to stop at this point of their travel. They would now, after an interval of time corresponding to a wing's length, be engaged and propelled onward by the driving-edges of the main heads in rear of them; but these are occupied by the spools 2 and $2^a$, which have just passed over to the main heads, spool 2 having previously rotated with the auxiliary head $C'^*$, and spool $2^a$ been detained by the side track, $D^2$, each spool having thus been put to the rear a distance corresponding to the length of two wings, which is represented by the period of transit with the head $C'^*$ in the case of spool 2 and that of rest in the side track, $D^2$, in the case of spool $2^a$. In this case, therefore, two spools would come in contact with each other on the head $A'^*$, as well as on the head $A^{2*}$, and the working of the machine would be stopped. This arrangement of the heads is consequently impossible. If, however, the combination of six-winged main heads, having two opposite pairs of wings omitted, with a two-winged intermediate head, three-winged auxiliary heads and corresponding side tracks is tried in a similar manner, it will be found to be operative. Such an arrangement is shown in Figs. $27^a$, $27^b$, $27^c$, $27^d$, $27^e$, and $27^f$, the devices being in their six successive positions, in each of which the heads have been rotated forward by a wing's length. When in this case the spools 1 and $1^a$, after having made one turn and a half on the head $B'^*$, pass over to the heads $A'^*$ and $A^{2*}$, as shown by Fig. $27^d$, they can continue their course on these heads without colliding with the other spools, 2 and $2^a$, as will be seen from this figure and the following ones. If it is desired to let the spools rotate twice on the intermediate head, the main heads must be eight-winged as may be proved in a similar manner. It results herefrom that in this machine the main heads must virtually have a number of wings (or, in other terms, their pitch-circle must present a number of wings' lengths) equal to double the greatest number of wings' lengths over which the spools are to travel on the intermediate heads. The virtual number of wings on the main heads may be greater, provided that the entire number be an even one; but any wings above the aforesaid number are superfluous. The number of wings on the auxiliary heads is to be equal to half the virtual number on the main heads, or (what according to the foregoing amounts to the same) equal to the greatest number of wings' lengths which the spools are to travel over on the intermediate heads. The side tracks are the same, but the duration of time for which the spools are to be detained in the side tracks must be regulated according to the number of wings' lengths the other spools are to travel over on the intermediate heads. The reason for this is as follows: When, as has been supposed with regard to Figs. $27^a$ to $27^r$, spools 1 and $1^a$ rotate on $B'^*$ by three wings' lengths, these spools will, after each rotation, be too late in the train of spools by three wings' lengths. Other spools—such as spools 2—which meanwhile do not pass over an intermediate head, must therefore be detained or put to the rear in the train by the same number of wings' lengths, and this is done by directing them over the heads $C'^*$, which must therefore also present three wings' lengths.

The branch track is an equivalent of the auxiliary head. It has exactly the same function and produces the same effect. One can therefore be used for the other, both on the inner and outer side of the main head, the purpose and operation being to detain the spool for a suitable period; but the auxiliary head will operate to take out of the thread the twist it has received on the main head, while the branch track has the opposite effect—that is, it detains the spool and retains the said twist in the thread. Either of these devices may therefore be used, as stated, according as it is desired that the twist shall be taken out or retained in the thread.

Figure 9:
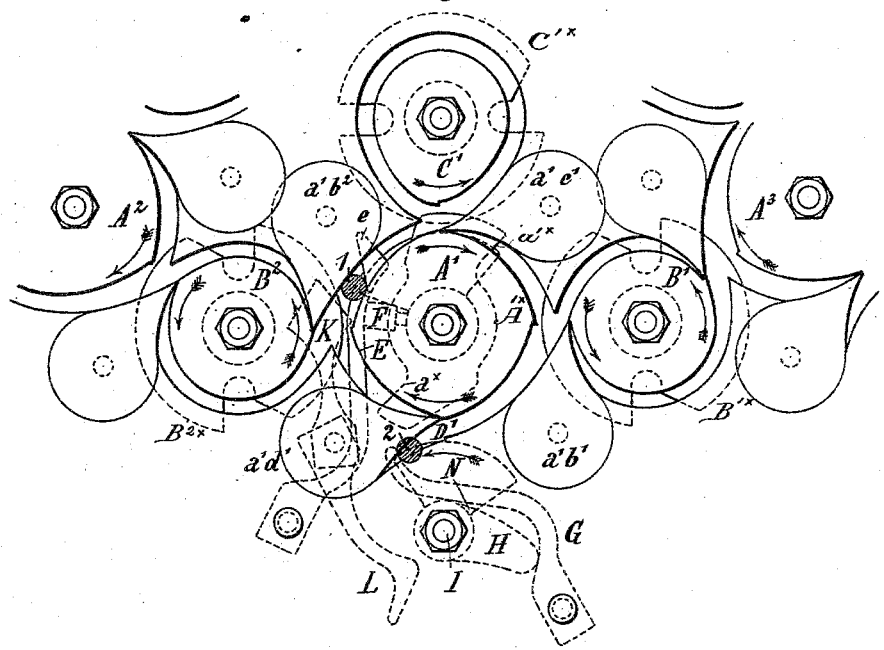
Figure 10:
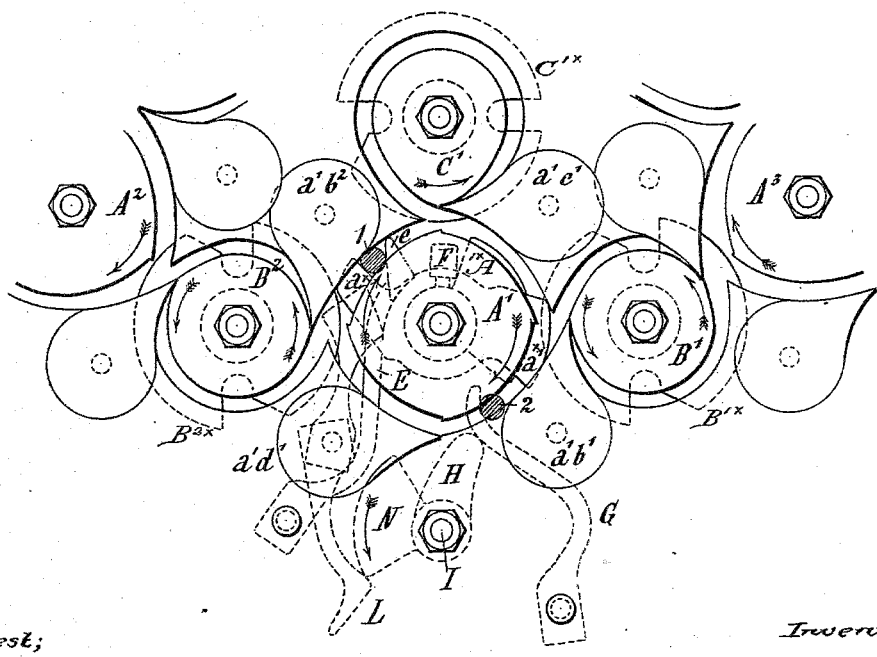
Figure 11:
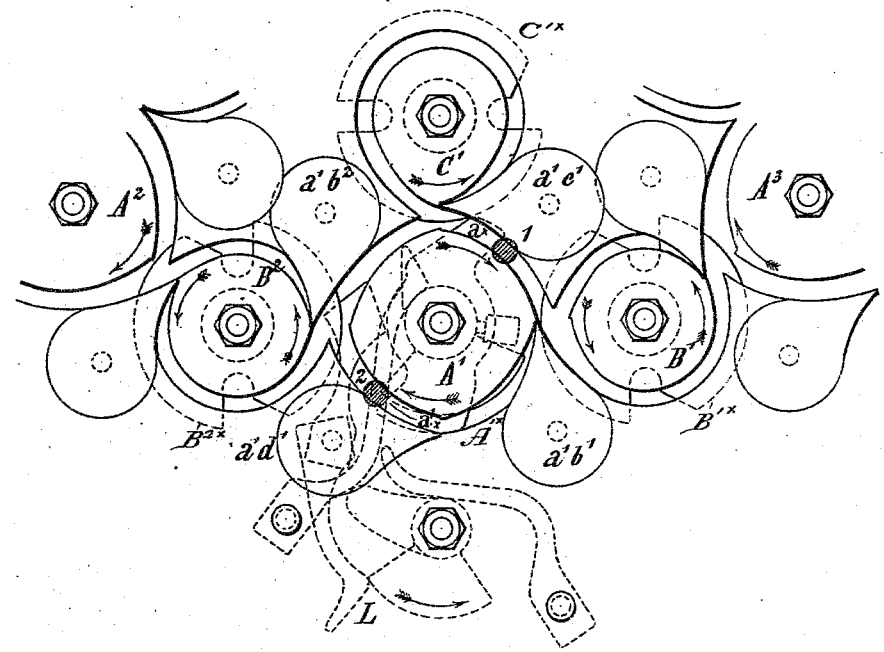
Figure 12:
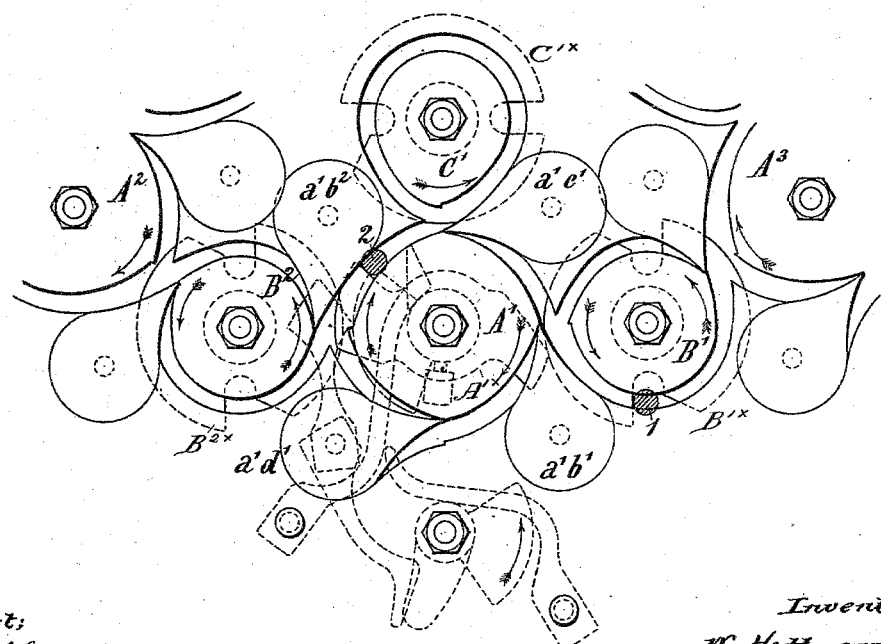

I will now proceed to describe the operation of the various parts of the machine which have hereinbefore been specified. For this purpose I will follow the course of the two spools which have been represented in Figs. 9, 10, 11, and 12 in four successive positions, each position being forward of the other by the length of one wing. Spool 1, Fig. 9, is supposed to have come from the main head $A^{2\times}$, and, after passing the intermediate head, $B^{2\times}$, to have arrived in the track of the main head $A'^{\times}$. It has consequently traveled over a distance equal to one wing's length on the head $B^{2\times}$. It is further to be supposed that other spools also coming from $A^{2\times}$ and preceding or following spool 1 make an entire circumrotation around the head $B^{2\times}$, so as to run back to $A^{2\times}$. These spools thus run over a distance equal to two wings' lengths on head $B^{2\times}$. Spool 1 must therefore be detained on the main head by a wing's length, and this is caused by the hereinbefore-described arrangement of parts, according to which the spool arrives on the main head at a point in the middle between two driving-edges, and where a wing has been cut away, the spool therefore remains at rest until it is propelled forward by the driving-edge $a^{\times}$. For the purpose of preventing the spool from being thrown by its inertia into the track of the auxiliary head $C'^{\times}$, which may not have been fully closed by the switch $a'\ c'$, the lever E has been arranged, the projecting beak $e$ of which stops the spool. This lever is kept in position for locking the track by a tappet, F, fixed to the axle of the head $A'^{\times}$, until the switch $a'\ c'$ has locked the track of the auxiliary head $C'^{\times}$. When the edge $a^{\times}$ of the head $A'^{\times}$ reaches the spool 1 the tappet F has released the lever E, which may consequently be pushed aside by the spool, so that the latter is free to continue its course. (See Figs. 10 and 11.) With regard to spool 2 it may be supposed that the same has arrived by the same track as spool 1, and that it is to rotate around the main head and then to run backward. Considering, now, that other spools which make a full rotation on intermediate heads, so as to reverse the direction of their motion, travel on these heads for a distance of two wings' lengths, spool 2 has to travel an equal distance, which may be attained by causing the same to run over a two-winged auxiliary head; but as the thread of any spool receives a twist when the latter passes over an auxiliary head, and as such twisting would finally become prejudicial to the working, an arrangement has been provided for in place of any outside auxiliary heads by means of which the spool is pushed out of the main track for a certain period and then replaced into the same, so that it may proceed on its course. This arrangement consists in the branch track D', with its switch $a'\ d'$. When the latter is open for the branch D', the spool propelled by the driving-edge $a^{\times}$ is forced as far into D' as is requisite for allowing the wing of the head $A'^{\times}$ to pass by the side of the shaft or pivot of the spool. As the spool is to be detained for a period corresponding to the length of two wings, it must be replaced into the main track before the driving-edge $a'^{\times}$ comes near to it. This is effected by the lever G, operated by the tappet H on the axle I, which is rotated by the pinion I'. (See Fig. 5.) The said tappet in due time causes the lever to push the spool out of the branch D' into the main track, whereupon it releases the lever. At the same time the tappet N has, by acting on lever L, opened the switch $a'\ d'$ for the main track, so that the edge $a^{\times}$ of head $A'^{\times}$ can now propel the spool 2 forward in the latter track, the lever G having offered no resistance against its being pushed aside by the pivot—i. e., the lower end of the shaft of the spool. If the spool is subsequently to continue its course in the main track, it must again be put to the rear by the length of two wings, which is done by causing it to pass along the track of the two-winged auxiliary head $C'^{\times}$, Fig. 12.

Instead of the head $C'^{\times}$, a branch track similar to D' might be applied; but it is preferable to let the spool make a rotation at this point. An auxiliary head, as C'×, is used, as the spool is not only thereby detained, but the twist which the thread has received on the main head is thereby undone again. It would also be possible to invert the arrangement, so as to have the heads C'× C²×, &c., on the outside and the tracks D' D³, &c., on the inside of the main heads.

If the spool 2 originally comes from the main head A³× by passing over B'× to A'×, it has to be detained or put to the rear by one wing's length. The spool after arriving in the track of A'× (see Fig. 10) is arrested by lever G, and thereby prevented from being projected into the branch track D', which may not have been completely closed. After a stoppage equal to one wing's length, this stoppage being due to the described construction of the head A'×, the spool is propelled onward by the edge $a^×$ of the said head. (See Figs. 11 and 12.)

In Fig. 16 a modification of the arrangement of the branch track D' and of the lever G is shown, by means of which it is possible to put a spool out of operation for any desired length of time. The lever G, which, by its forked end, carries the spool out of the main track into the branch track D', is worked from the controlling apparatus, Figs. 13, 15, to be described hereinafter, this apparatus rendering it possible to let the lever remain at rest for any desired period and then to shift it again. The branch track D' is made long enough to allow it to be closed by the switch a' d' after the spool has been carried into it by the lever G. The main track is then free for the passage of other spools, while the spool which has been stopped remains in the branch track. The switch a' d' has in this case also to be worked from the said controlling apparatus. When the spool is to operate again, the controlling apparatus opens the switch, causes the lever G to move the spool back into the main track, and then recloses the switch. The lever G may thereupon be shifted out of the way by the pivot of the spool.

The controlling apparatus, which is shown by Fig. 13 in an end view, by Fig. 14 in plan, by Fig. 15 in a front elevation, and by Figs. 1 and 2, in connection with the machine, consists of the following parts: S and S' are two series of toothed wheels, over which pitch-chains T run. For each pair of switches operating together two chains are required, one for opening, the other for closing them. The upper wheels, S, are fixed on a common axle, s, rotating in bearings fixed to the under side of the bottom plate, P², and receiving its motion from the machine by means of a chain, 15, (shown in Fig. 2,) which chain 15 runs on a sprocket-wheel, 16, on shaft s, and a sprocket-wheel, 17, mounted on a shaft, 18, that is supported in brackets rising from the plate P², which shaft 18 is driven by bevel-wheels 19 20, the latter secured to a shaft that is driven by a wheel, 21, from one of the wheels I'. (See Fig. 1.) The lower wheels, S', are pivoted separately in adjustable forks V. Each link of the chains T is provided with holes t, through which pins u can be passed, these pins allowing of their being fastened by a nut screwed on their end. When the chains move the said pins act on the pins x, fixed, by means of set-screws, in the slides Y, guided by slits in the bars z and z'. To the ends y of the slides Y the rods r and r' are fastened by set-screws, these rods being in connection with the levers R and R', Fig. 6, by which the switches between the main and intermediate heads are operated, as has hereinbefore been explained. The working of the said switches is thus made dependent upon the position of the pins u in the chain T, which position has to be varied according to the pattern to be produced.

The threads running off from the spools pass over guiding-pins to certain devices, by which they are completely united to a braid or lace, as in former braiding-machines; but, while hitherto smooth cylindrical rollers have been used for the purpose of taking up the braid or lace, or of drawing it forward, and thereby winding off the threads from the spools, rollers of other forms are used in my improved machine.

For perforated or dentated patterns it is requisite that certain parts of the lace or braid be wrought closer, and consequently shorter, others more open, and therefore longer. When, however, smooth cylindrical rollers are applied for the purpose stated, equal lengths of threads will be drawn off from all spools, and all the threads will be braided together with equal closeness. A difference in the closeness can be attained by weights of different size, which, according to the present practice, are hung to the threads; but the effect of the same is but very limited.

In the taking-up apparatus of my invention the braid or lace is drawn from the machine by rollers, which are smooth upon the parts of their periphery, corresponding to the close parts of the braid, whereas such parts as draw along loose parts of the braid are more or less deeply dentated or corrugated, according to the degree of looseness required. Thus Fig. 18 shows a pair of rollers the part h of which is smooth or cylindrical, as shown by the section, Fig. 17, whereas the part i is dentated, according to Fig. 19. Fig. 20 represents another form, in which there are two cylindrical parts, h h, one part, i, corresponding to Fig. 19, and one part, k, having teeth of a greater radial length, as represented in section by Fig. 21. The sectional form, the breadth, and the relative position of the different parts of the rollers have, of course, to be adapted in every case to the special pattern of the braid or lace.

The Figs. 22 to 25 show a modification of the described taking-up device, which consists, essentially, of a roller, l, variously dentated or left partly smooth in the same manner as the rollers in the first arrangement, and of a pitch-chain, m, into which the said roller gears. The chain runs over two guiding-rollers, n and o, which may be smooth. The roller n, Fig. 22, is made adjustable by screws and nuts, (shown in Fig. 23,) for the purpose of allowing the chain to be stretched, and all the rollers are pivoted in a frame, U. This apparatus is also shown in Fig. 2 in connection with the machine. The braid or lace passes from below between the chain and the roller l, and after having left the device it is smoothed in any suitable manner. The roller l in Figs. 22 and 23 shows a row of short teeth at either edge and a row of long teeth in the middle, whereas in Figs. 24 and 25 a form is represented with two rows of short teeth, one row of teeth of medium length and one row of long teeth. As in the first case, the form of the teeth must be made to correspond to the pattern of the braid or lace.

The apparatus is driven by a chain, v, running over the chain-wheels $v'$ and $v^2$, the former being keyed on the shaft of the roller l, while the latter is in connection with other known parts of the machine. The take-up device, constructed according to the first arrangement, may be driven in a similar manner.

I claim as my invention—

1. The combination of the top plate, P', main heads having a number of wings or driving-edges, or the space thereof equal to double the greatest number of wings' lengths which the spools are to travel over while carried by the intermediate heads, intermediate heads provided with two or any even number of wings and alternating with the main heads, and auxiliary heads each having a number of wings equal to half the number of wings and wing-spaces of the main heads for detaining the spools, together with the switches for directing the spools in their course, and devices for revolving the heads and operating the switches, substantially as described.

2. The combination, with the top plate, P', main heads having a number of wings or driving-edges, or the space thereof equal to the greatest number of wings' lengths which the spools are to travel over while carried by the intermediate heads, intermediate heads provided with two or any even number of wings alternating with the main heads, and branch tracks D' for detaining the spools, together with switches for directing the spools in their course, and devices for revolving the heads operating the switches and shunting the spools into and out of said branch tracks, substantially as described.

3. The combination of the top plate P', the main heads $A'^{\times}$ $A^{3\times}$, &c., having a number of wings or driving-edges, or the space thereof equal to double the greatest number of wings' lengths which the spools are to travel over on the intermediate heads, intermediate heads, as $B'^{\times}$ $B^{2\times}$, &c., alternating with the main heads, each of which is provided with two or any even number of wings, the auxiliary heads $C'^{\times}$ $C^{3\times}$, &c., having each a number of wings equal to half the number of wings and wing-spaces of the main heads, the side tracks, $D'$ $D^3$, &c., and the switches $a'$ $b'$, $a'$ $b^2$, &c., $a'$ $c'$, $a^3$ $c^3$, &c., and $a'$ $d'$, $a^3$ $d^3$, &c., together with devices for revolving the heads and operating the switches, substantially as described.

4. The combination, with the top plate, P', of the intermediate heads, $B'^{\times}$ $B^{2\times}$, &c., the auxiliary heads $C'^{\times}$ $C^{2\times}$, &c., the side tracks, as $D'$ $D^3$, &c., the switches, as $a'$ $b'$, $a'$ $b^2$, &c., $a'$ $c'$, $a^3$ $c^3$, &c., and $a'$ $d'$, $a^3$ $d^3$, &c., of the main heads $A'^{\times}$ $A^{3\times}$, &c., having recesses or truncations equal to the size of one or more wings, for the purpose of allowing the spools to remain at rest within these recesses or truncations, substantially as described.

5. The combination, with the rotating main heads $A'^{\times}$ $A^{3\times}$, &c., of levers E and tappet F, said tappet being on the axis of the main heads, substantially as described.

6. The combination, with the rotating main heads $A'^{\times}$ $A^{3\times}$, &c., and branch tracks D D', &c., of the lever G and the rotating tappets H, substantially as described.

7. The combination, with the top plate, P', and main head $A'^{\times}$ $A^{3\times}$, &c., of the side tracks, $D'$ $D^3$, &c., switches to close the track, the levers G, and means for operating the said switch and the lever G, substantially as described.

8. The combination, with the switches $a'$ $d'$, of the levers K, tappets M, main heads, the rotating axles I, and tappets N, substantially as described.

9. A controlling or pattern mechanism for actuating the switches of the described machine, the same consisting of chains T, provided with removable pins u, wheels S, slides Y, rods $r$ $r'$, and levers attached to the axles of the said switches, combined substantially as described.

10. The take-up apparatus consisting of a roller provided with one or more rows of peripheral teeth or corrugations of varying depth, and with one or more smooth strips, the same gearing with another similar roller, substantially as described.

In testimony whereof I have signed my name to this specification in the presence of two subscribing witnesses.

WILHELM HEDTMANN.

Witnesses:
FRIEDRICK SOEDING,
WILHELM WAGENER.